United States Patent [19]
Bergström

[11] Patent Number: 4,937,284
[45] Date of Patent: Jun. 26, 1990

[54] MODIFIED POLYOLEFIN, METHOD FOR MAKING THE SAME, AND USE THEREOF

[75] Inventor: Christer Bergström, Helsinki, Finland

[73] Assignee: Neste Oy, Finland

[21] Appl. No.: 235,686

[22] Filed: Aug. 23, 1988

Related U.S. Application Data

[63] Continuation-in-part of Ser. No. 3,788, Jan. 15, 1987, abandoned, which is a continuation-in-part of Ser. No. 812,181, Dec. 23, 1985, abandoned.

[30] Foreign Application Priority Data

Dec. 21, 1984 [FI] Finland .................................. 845110

[51] Int. Cl.$^5$ ............................................ C08L 51/00
[52] U.S. Cl. ........................................ 525/57; 525/59; 525/60; 525/61
[58] Field of Search ......................................... 525/57

[56] References Cited

U.S. PATENT DOCUMENTS 4,600,748 7/1986 Schmukler et al. .................... 525/57
4,632,959 12/1986 Nagano ................................. 525/57

Primary Examiner—John C. Bleutge
Assistant Examiner—David W. Woodward
Attorney, Agent, or Firm—Steinberg & Raskin

[57] ABSTRACT

Modified polyolefin comprising a polyolefin linked to a hydrolyzable silane which is reactable with polyvinyl alcohol and being chemically bound to polyvinyl alcohol by the silane, and method for preparing the same.

11 Claims, 2 Drawing Sheets

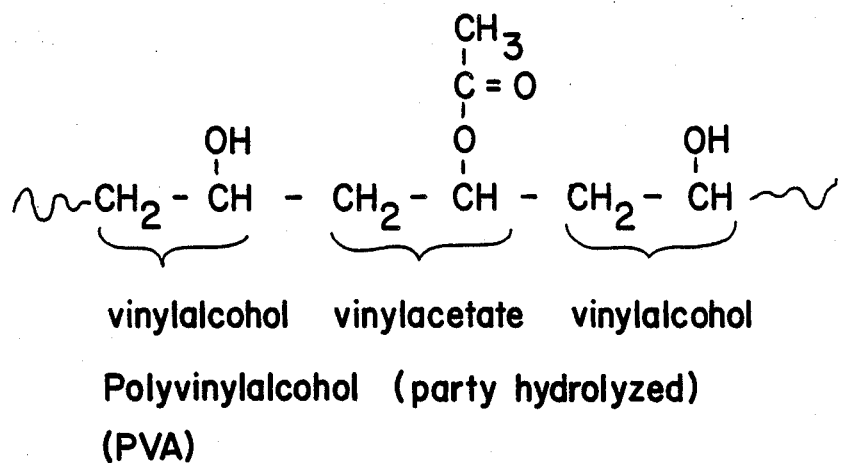
Polyvinylalcohol (party hydrolyzed)
(PVA)
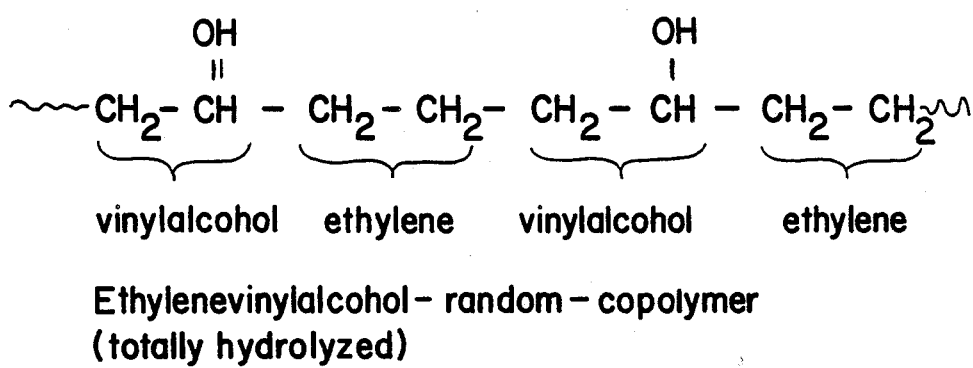
Ethylenevinylalcohol-random-copolymer
(totally hydrolyzed)
FIG. 1

FIG. 2
The reaction between polyethylene grafted with alkoxysilane, and polyvinylalcohol.
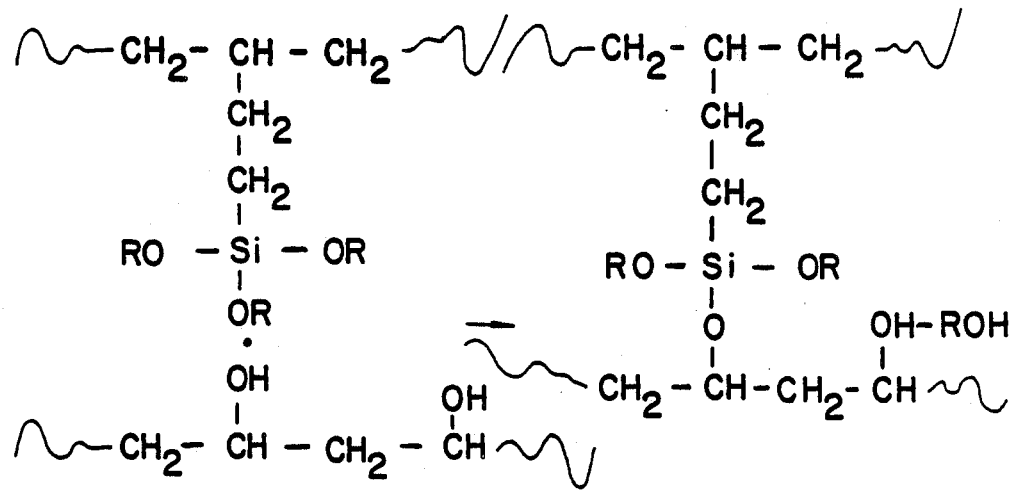
Ethylene/vinylalcohol block copolymer  FIG. 3
— LOPE
---- PVA
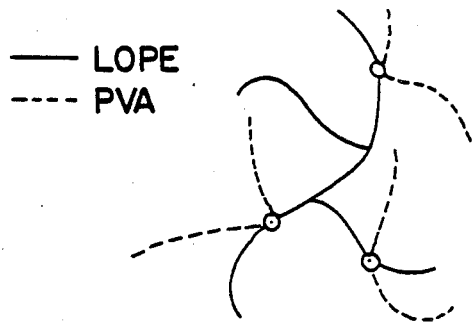
FIG. 4
The reaction between amino silane and an ester copolymer:
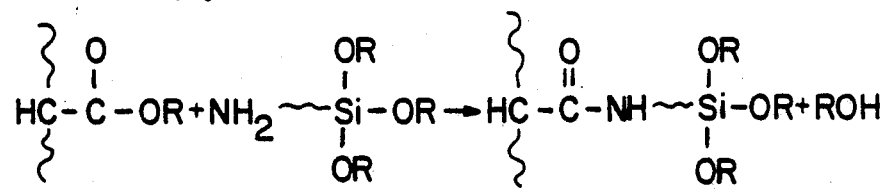

MODIFIED POLYOLEFIN, METHOD FOR MAKING THE SAME, AND USE THEREOF

CROSS-REFERENCE TO RELATED APPLICATIONS

The present application is a continuation-in-part of co-pending U.S. application Ser. No. 003,788 filed Jan. 15, 1987 and now abandoned, which is in turn a continuation-in-part of co-pending U.S. application Ser. No. 812,181 filed Dec. 23, 1985 and now abandoned.

BACKGROUND OF THE INVENTION

The present invention is directed to a modified polyolefin, a procedure for the manufacturing thereof, and to the use of the modified polyolefin. More particularly, the present invention is directed to manufacturing an olefin/vinyl alcohol block copolymer.

Ethylene/vinyl alcohol copolymers are presently being manufactured by hydrolyzing an ethylene/vinyl acetate random copolymer. Hydrolysis (alcoholysis) is effected with the aid of an alcohol. The mixture may be either acidic or basic. Hydrolyzing may be carried out in a solid state, in a molten state, or in solution. These ethylene/vinyl alcohol copolymers are random copolymers.

There is a number of patents concerning this procedure for manufacturing the ethylene/vinyl alcohol random copolymer, a summary of which is found in the article "Reactivity of Ethylene Vinyl Acetate Copolymers: A Critical Evaluation of the Comprehensive Patent Literature on the Acetoxy-Hydroxide Transformation of Ethylene Vinyl Acetate Copolymers", by R. J. Koopmas, R. van der Linden and E. F. Vansant, in *Polymer Engineering and Science*, July 1982, Vol. 22, No. 10, Page 645. All these procedures are based upon hydrolysis of the acetate group to become an alcohol group; there is no mention of any block copolymers.

Commercial ethylene/vinyl alcohol random copolymers are of two types. Grades containing 20 to 30 mol-% vinyl alcohol are being marketed, for use principally in extrusion and in powder coating of steel tubing ("Levasint" by Bayer, and "Mirawithen" by VEB Leuna-Werke Walter Ulbricht). These brands are made from ethylene/vinyl acetate random copolymer manufactured by a high pressure technique.

Additionally, commercially available grades contain 60 to 80 mol-% vinyl alcohol, which are mostly used for gas-barrier layers in multi-layer products (EVAL by Kuraray, and Soarnol by Nippon Gohsei). These grades are manufactured by adding ethylene to the polyvinyl acetate process, and hydrolyzing the product in the same manner in which polyvinyl alcohol (PVA) is made from polyvinyl acetate. The gas-barrier of the product drops abruptly if there is less than 60 mol-% vinyl alcohol.

When the ethylene/vinyl alcohol random copolymer contains more than 60 mol-% vinyl alcohol, it forms monoclinic crystals (the same as PVA); when there is less than 20 mol-% vinyl alcohol, the random copolymer forms rhombic crystals (the same as polyethylene). Between these concentrations, a mixed crystal structure is formed. Only the monoclinic crystal structure is sufficiently dense to be used as barrier plastic.

U.S. Pat. No. 4,632,959 to Nagano concerns a dispersion of two different polymers in which one of the components can be an ethylene/vinyl alcohol random copolymer as illustrated in FIG. 1 of the present case, in which there are vinyl alcohol units between the ethylene units in a straight chain.

Polyvinyl alcohol (PVA) is principally used as a dispersing agent in PVC suspension polymerization. By regulating the molecular weight of PVA and its degree of hydrolyzation, the properties of the PVC can be regulated. When PVA has a sufficiently high degree of hydrolyzation, it is water-soluble. This water-solubility and difficult processability restrict the use of PVA in the plastics industry.

Dry PVA is noteworthy, because it possesses excellent barrier properties (gas-barriers). With a view to eliminating the drawbacks, the ethylene/vinyl alcohol random copolymer (EVAL) has been developed. However, the gas-barrier of EVAL is dependent upon moisture. It is therefore necessary to protect the EVAL film against air humidity, for example with a polyethylene film on both sides thereof. Moreover, EVAL does not adhere to polyethylene as is; an adhesion layer has to be additionally used between these components. It is however a fact that such a five-layer coextrusion design is highly exacting and expensive, with the EVAL and adhesion plastics similarly being very expensive.

EVAL may also be admixed with plastic, so that it is then less sensitive to moisture. For example, EVAL is admixed with polyethylene terephthalate (PET). In this manner, bottles with better gas-barriers can be produced, than by means of coextrusion. EVAL may also be admixed with polyolefins, whereby an adequate gas-barrier is obtained (a 30 to 50% addition of EVAL is equivalent to the resistance of polyamide). At the same time, adhesion to polyolefins is obtained (no adhesion plastic required) (Neste). The above-noted mixtures are macro-mixtures. Two phases are produced, and for this reason, the products are not transparent.

It is possible to produce silicone from silane by polycondensation. Silanes are used in the plastics industry as a coupling agent, as a cross-linking agent, and to improve adhesion. The coupling agent concept is based upon causing the hydroxy groups on the surface of a pigment or filler to condense with the silane. The chemical composition of the surface is thereby changed such that it wets the plastic, is admixed with the plastic, and/or conceivably reacts chemically with the plastic. Miscibility of the filler and plastic, the adhesion between the two, and the properties of both the molten and solid plastic mixture, are improved in this manner.

It is also possible to cross-link, for example, polyethylene with silane in a manner such unsaturated alkoxysilane is grafted with the aid of peroxide or of electron radiation to the polyethylene chain. The silane groups are thereafter allowed to undergo hydrolysis, and to condense with the aid of water and a condensation catalyst. There is an abundance of patents and literature dealing with this technique. Grafting may also be achieved with silyl peroxide (Akzo), while the unsaturated silane may already be added as a comonomer at the polymerizing step (Mitsubishi). With silane, it is also possible to improve the adhesion, e.g. between plastic and metal, or between non-polar plastic and polar plastic in multi-layer products.

SUMMARY OF THE INVENTION

According to the invention, it has been found that it is possible to manufacture olefin/vinyl alcohol block copolymers by joining polyvinyl alcohol (PVA) chemically to polyolefin with the aid of silane, whereby wholly new branched block copolymers are obtained, which contain polyolefin branches (non-polar) and polyvinyl branches (polar).

Accordingly, it is an object of the present invention to provide new olefin/vinyl alcohol block copolymers.

It is also an object of the present invention to provide olefin/vinyl alcohol block copolymers which have improved properties, e.g. gas/oil resistance, water resistance, melt index and strength.

It is a further object of the present invention to promote uses of new olefin/vinyl alcohol block copolymers as adhesive layers in multi-layer products or as emulsifiers in further polymerization reactions.

It is a further object of the present invention to provide new methods for obtaining olefin/vinyl alcohol block copolymers.

These and other objects are attained by the present invention which is directed to a modified polyolefin comprising a polyolefin linked to a hydrolyzable silane which is reactable with polyvinyl alcohol, and being chemically bound to the polyvinyl alcohol by said hydrolyzable silane. The present invention is also directed to a method of synthesizing the modified polyolefin, by linking a polyolefin to a hydrolyzable silane which is reactable with polyvinyl alcohol. The polyolefin is then chemically bound to the polyvinyl alcohol by reacting the linked silane with the polyvinyl alcohol.

The modified polyolefin comprises about 1 ∝ 99% by weight of the polyolefin and about 99-1% by weight of the polyvinyl alcohol, with the amount of the hydrolyzable silane linked to the polyolefin being sufficient to bind the polyvinyl alcohol thereto.

An olefin/vinyl alcohol block copolymer possesses both the properties of the polyolefin and of the polyvinyl alcohol. The resulting product may be processed by all procedures for processing polyolefin, and the product is both water-resistant (polyolefin) and resistant against gas and oil (polyvinyl alcohol). Moreover, it is possible by the procedure of the present invention, to increase substantially the molecular weight of the polymer (to lower the melt index), without risk of cross-linking. Since the olefin/vinyl alcohol block copolymer is simultaneously both polar and non-polar, this polymer may also be used as a so-called emulsifier polymer in plastic alloys including polar as well as non-polar components. The olefin/vinyl alcohol block copolymer may also be used as an adhesion layer in multi-ply products having polar layers, metal layers, and/or non-polar layers.

BRIEF DESCRIPTION OF THE DRAWINGS

The invention will be described in greater detail below, with reference to the accompanying drawings, in which FIG. 1 is an illustration of the known ethylene/vinyl alcohol random copolymer;

FIG. 2 is an illustration of the reaction of synthesizing a modified polyolefin in accordance with the present invention;

FIG. 3 is an illustration of a modified polyolefin synthesized in accordance with the present invention; and FIG. 4 is an illustration of joining a hydrolyzable amino silane to a polyolefin chain in accordance with the present invention.

DESCRIPTION OF THE PREFERRED EMBODIMENTS

According to the present invention, it has been found, among other factors, that hydrolyzable silane which has been grafted to or copolymerized with a polyolefin chain, reacts with polyvinyl alcohol. This reaction takes place without presence of water and without a condensation catalyst (FIG. 2). When the reaction takes place in a dry mixture, no cross-linking occurs; the polyolefin molecule and the polyinyl alcohol (PVA) molecule combine by way of the silane. Mixing and reaction take place at a micro-level (i.e. a molecular level). An olefin/vinyl alcohol block copolymer (FIG. 3), a completely new, transparent plastic, is obtained in this manner.

High pressure polyethylene (low density polyethylene LDPE), low pressure polyethylene (high density polyethylene HDPE, medium density polyethylene MDPE, linear low density polyethylene LLDPE), polyprophylene (PP), poly-1-butylene (PB), poly-4-methyl-1-pentene (TPX) or other polyolefin plastics, rubbers or additives, may be used as the polyolefin reactant. It is also possible to use copolymers, mixtures, and/or homopolymer/copolymer mixtures of the above-noted polymers.

According to the present invention, the silane may be grafted with peroxide, with electron radiation, or by another expedient. Alternatively, unsaturated silane may be added as a component at the polymerizing step. Such unsaturated silane includes vinyltrimethoxysilane, vinyltriethoxysilane, vinyl-tris(betamethoxyethoxysilane) or gammamethacryloxypropyltrimethoxysilane. All these silanes are hydrolyzable. The grafting may also be carried out using silyl peroxide.

γ-aminopropyltriethoxysilane (AMEO) and other aminosilanes react with EBA (ethylene-butylacrylate copolymer) and with other ester copolymers according to the formula in FIG. 4. This is one way to join a hydrolyzable silane to a polyolefin chain without grafting or copolymerizing the unsaturated silane with the aid of a radical initiator. This possibility is presented here as an example, but there are still other possibilities of joining a hydrolyzable silane to a polyolefin chain either directly or by linking with another chemical compound. The manner in which the hydrolyzable silane is chemically joined to polyolefin has, in principle, no influence on the end result. The reaction rate between silane and PVA merely varies depending on silane type, but as a rule this reaction rate is quite high.

The polyvinyl alcohol for use in accordance with the present invention, may be of grades commonly used in suspension polymerizing PVC. The polyvinyl alcohol may be partially or completely hydrolyzed (with vinyl acetate as a comonomer).

The olefin/vinyl alcohol block copolymer may be prepared using 1 to 99% by weight polyolefin, 99 to 1% by weight polyvinyl alcohol, and 0.1 to 10% by weight silane, based upon the polyolefin, along with the peroxide quantity required for grafting (e.g. 0.01 to 0.5% by weight dicumyl peroxide, based upon the polyolefin) or another radical former. All chemical components that are required may be added in a melt mixer (e.g., a Banbury mixer, a Continuous mixer, a Buss Kokneader, etc.). All ingredients may be simultaneously added to the mixer in the form of a dry mixture. Alternatively, the components may be premixed and grafted in solid form or in molten form. Additionally, the silane-peroxide mixture and the polyvinyl alcohol may be separately added to the mixer.

The principal consideration is that addition of the various components takes place under conditions such that the silane first becomes grafted to the polyolefin, and only thereafter reacts with the polyvinyl alcohol. The polyvinyl alcohol may be added after grafting, or the silane grafting may be carried out at a temperature at which the polyvinyl alcohol is not in molten condition. The reaction mixture should be dry so that the silane will not condense. This implies that the polyvinyl alcohol has to be first dried.

The olefin/vinyl alcohol block copolymer manufactured in accordance with the present invention, may be used as is, in applications where ethylene/vinyl alcohol random copolymer is being used. The olefin/vinyl alcohol block copolymer of the present invention may be used as a barrier layer in multi-layer products such as films, bottles, and other products. In co-extruded products, commercial adhesion plastics (e.g. Admer, Plexar, etc.) may be used for adhesion layers, or these adhesion plastics may be eliminated, depending upon the polyvinyl alcohol content and on the properties of the other plastic layers. The product of the present invention may also be used in powder coating.

The advantage of the olefin/vinyl alcohol block copolymer manufactured in accordance with the present invention, is that the preparation is exceedingly simple and inexpensive, with the raw materials being also inexpensive, as compared with commercial EVAL. Furthermore, many kinds of raw materials may be used, for example polypropylene instead of polyethylene, while the degree of hydrolysis of the polyvinyl alcohol may vary. The vinyl alcohol content may also be regulated within wide limits, in accordance with the intended use of the end product.

Due to the segmented structure of the olefin/vinyl alcohol block copolymer, good adhesion to polyolefins is achieved in coextrusion (there is no need for adhesion plastic as an intermediate layer). The end products may be heat-sealed with themselves or with polyolefin.

It is thus understood that the olefin/vinyl alcohol block copolymer can be used, as is, ass an intermediate layer between polyolefin films (three-layer coextrusion), or together with another polar plastic layer, for instance polyamide. The olefin/vinyl alcohol block copolymer is both gas-resistant and water vapor-resistant, with the gas-resistance not being very highly sensitive to moisture. The product may furthermore be diluted with polyolefin or polyvinyl alcohol, depending on if superior water vapor barriers or superior gas barriers are required. Furthermore, the product of the invention may be mixed with other polar or non-polar plastics; in this manner, the barrier properties (gas or water vapor resistance) may be improved, or surface properties thereof may be altered (i.e., to become polar or non-polar).

The olefin/vinyl alcohol block copolymer prepared in accordance with the present invention, may also be used as a so-called emulsifier polymer in polymer mixtures and in alloys. In this case, the product becomes concentrated between the immiscible phases, and improves adhesion between the two, along with the useability and processability of the resulting end product. By using silane in higher proportions to the PVA content, the melt index can be lowered. When the melt index of the unmodified polyolefin is low, very low melt indices (high molecular weights) are attained without cross-linking in the product. A product is obtained which has molten and solid state properties resembling HMW-HDPE (high molecular weight, high density polyethylene). For example, a modified polyolefin is attained which has a melt index (190° C., 2.16 kg.) of less than about 0.2 g/10 min. Such olefin/vinyl alcohol block copolymers having very high molecular weight can be used in applications where high melt strength, good mechanical properties, and resistance to chemicals are all required. Applications of this kind include uses in cable sheaths, tubes and pipes, blow-molded products, certain high strength injection-molded products, rotation-molded products, and in sintered products.

Use of the modified polyolefin in multi-component products is also contemplated, because the hydroxy groups of PVA have good adhesion to metals, ceramic substances, fillers and polar plastics, etc. Whenever required, these adhesion characteristics may be additionally improved by using coupling agents, such as silane for example. In these instances also, the resistance properties of PVA may be utilized. It would in fact be possible to construct a strong and impermeable gas tank for an automobile, with such an olefin/vinyl alcohol block copolymer having a very high molecular weight.

The high melt strength and the high crystallizing point of PVA could also be utilized in manufacturing foamed products. When PVA crystallizes, the foam will no longer shrink. The gas-resistance, heat tolerance, and strength of a PB tube could be improved by grafting silane to the PB and causing it to react with PVA, or by co-extruding or mixing the PB with finished olefin/vinyl alcohol block copolymer.

It is clear that the block copolymers of the present invention which are illustrated in FIGS. 2-4 are totally different from the ethylene/vinyl alcohol random copolymer illustrated in FIG. 1. The vinyl alcohol units between the ethylene units are not reactive components in the ethylene/vinyl alcohol random copolymer of FIG. 1, because the vinyl alcohol units are already bound to the ethylene units at the reactive points thereof. Therefore, the vinyl alcohol units of the random copolymer in FIG. 1 are not available for reaction, e.g. with silane. Furthermore, concerning U.S. Pat. No. 4,632,959 to Nagano, the silane and the ethylene/vinyl alcohol random copolymer cannot react with one another because they are in different phases from one another.

The present invention, e.g. the manufacture of the olefin/vinyl alcohol block copolymer, is further illustrated by way of the following, non-restrictive examples:

EXAMPLE I

The formulations listed under separate tests 1-9 in Table 1, were each separately mixed in a Haake Rheomix 4000 mixer, for 7 minutes, using Roller rotors, at a speed of 85 min. $-^1$ and a jacket temperature of 200° C. A nitrogen bed was used during the mixing, while the PVA was dried for 12 hours at 80° C. prior to the mixing.

EXAMPLE II

After mixing, each of the mixtures of tests 1-9 was rough-ground, with sheets being pressed at 200° C. from the ground material. The following properties were determined by measurement: melt index (MI), density ($\rho$), degree of cross-linking, tensile strength, fraction soluble in hot 50:50 water/isopropanol mixture (i.e., the degree of grafting of PVA), and oxygen permeability of a 100 micron sheet. The results of each of the preparations of tests 1–9 are listed in Table 2.

Formulations 1–9 prepared in Example I and listed in Table 1, contain a fairly small amount of polyvinyl alcohol, with the quantities and types of components being systematically varied as indicated in Table 1. Table 2 reveals that by grafting more vinyltrimethoxysilane (VTMO) to LDPE (Tests 1, 2 and 3), a more efficient binding (i.e. a smaller soluble part) of Mowiol 4/88 (PVA-1) is achieved. At the same time however, the melt index (MI) decreases, due to increasing molecular size. However, the degree of cross-linking is rather low at all times, while oxygen transmission, measured by the pressure-free Oxtran 100 method, decreases slightly.

By totally omitting the silane (Test 4), about half of the PVA-1 can be made to react with LDPE under these conditions, with the gas transmission also then being clearly higher. When dicumyl peroxide (DCP) is omitted as well (Test 5), then the situation becomes even worse. However, the oxygen transmission in a physical LDPE/10% PVA-1 mixture of this type is still lower than the oxygen transmission of pure LDPE, which is 2,100 $cm^3/m^2d$.

By using vinyltriethoxysilane (VTEO) (Test 6), PVA-1 can be bound to LDPE slightly more efficiently than by using vinyltrimethoxysilane (VTMO) (Test 2). The soluble part is less and the oxygen transmission is lower, however at the same time the melt index has dropped considerably. Alkotex 72.5 (PVA-2) (Test 7) produces somewhat lower oxygen transmission than Mowiol 4/88 (PVA-1) (Test 2), although the degree of hydrolysis (the vinyl alcohol content) is somewhat lower. It appears as if PVA-2 reacted better with the silane (resulting in a lower soluble part and a lower melt index). The density ($\rho$) is then naturally lower.

When HDPE is used for the base polymer (Test 8), or a higher PVA-1 content is utilized (Test 9), then the oxygen transmission can be reduced even more. 1.0 phr. VTMO and 0.05 phr. DCP appear to be sufficient for higher PVA-1 content as well (resulting in a smaller soluble part). The strength characteristics of the HDPE/vinyl alcohol block copolymer are strikingly good (Test 8).

EXAMPLE III

Since the oxygen transmission results reported in Table 2 were not low enough with a view to barrier plastic applications, the same technique was applied as in Example I for making mixtures containing 40%, 50% and 60% by weight PVA-1. Table 3 lists these respective formulations as Tests 10–12. LDPE was the base polymer, with a fairly small amount of DCP and VTMO being used, because the proportion of LDPE in the total quantity was rather small. Corresponding LDPE/PVA-1 mixtures without chemical binding were also prepared, for use as references (Tests 13–15).

EXAMPLE IV

Table 4 lists the results concerning the effect of high PVA-1 content on the properties of the ethylene/vinyl alcohol block copolymer (Test 10–12). The oxygen transmission drops very steeply with increasing PVA-1 content, so that when the PVA-1 content is 60% by weight, the oxygen transmission of the ethylene/vinyl alcohol block copolymer corresponds to the level of polyamide-6 (PA-6) (11.2 $cm^3/m^2d$). The melt index simultaneously drops, with density and stiffness increasing. In spite of the high PVA-1 content, the soluble part is extremely small, while the degree of cross-linking is low.

If, in contrast, the PVA-1 is not chemically bound to polyethylene, then the properties show no improvement (Tests 13–15). The oxygen transmission is higher than that of polyethylene, and increases with increasing PVA-1 content. The melt index also remains high, while the PVA-1 is almost totally soluble.

Coextruded strips with LDPE (MI=4 g/10 min., $\rho=0.922$ $g/cm^3$) were prepared with the aforementioned preparations, the melt temperature being 200° C. It was found that samples 10–12 fully adhered to the polyethylene, while samples 13–15 has no adhesion. The ethylene/vinyl alcohol block copolymer is a more advantageous barrier plastic in this respect, that PA-6 which required a separate adhesion plastic layer when coextruded with polyethylene.

EXAMPLE V

An ethylene/vinyl alcohol block copolymer containing 50% by weight PVA-1 was also produced in a continuously operating Buss Kokneader mixer, in a manner where 50% LDPE (MI=7.5 g/10 min., $\rho=0.918$ $g/cm^3$) and 50% by weight dried PVA-1 were mixed as a dry mix, and introduced into the Buss Kokneader, which had a temperature profile of 180° C., 210° C., 180° C. After the first zone, 0.03 phr. DCP and 1.0 phr VTMO were injected.

The ethylene/vinyl alcohol block copolymer thus obtained was granulated, with a blowm film having 100 microns thickness prepared from the granulate. Concerning the properties of the prepared film, it was observed that the film was homogeneous and transparent, indicating that the LDPE and PVA had been so efficiently mixed, as a result of the grafting, that the size of separate phases was less than the wave length of light. It was also noted that the oxygen transmission of the blown film (Test 16, 6.7 $cm^3/m^2d$) is considerably less than that of equivalent pressed sheet (Test 11).

EXAMPLE VI

Three formulations were prepared by admixing ethylene-silane copolymers with PVA and are presented as tests 17, 18, and 19 in Table 5. The mixing was carried out in the same manner as in tests 0, 11, and 12, with the exception that ethylene-VTMO copolymer was used instead of LDPE, DCP, and free VTMO. The ethylene-VTMO copolymer had MI=0.2 g/10 min, $\rho=0.917$ $g/cm^2$, and VTO content=1.0%.

EXAMPLE VII

Testing of the formulations prepared in Example VI was carried out in the same manner as the testing of the formulations in tests 10, 11, and 12, with the results being reported in Table 6.

From Table 6, it is seen that lower oxygen transmission and better mechanical properties are obtained by using an ethylene-silane copolymer instead of an ethylene silane graft copolymer, because a more homogeneous product is obtained. However, the amount of non-reacted PVA is higher. There is also a very rapid decrease in melt index.

In the following examples, a polyolefin and a polyvinylalcohol have been joined with hydrolyzable silanes which are not unsaturated alkoxysilanes. If it is desired to graft or copolymerize a silane to a polyolefin chain with the aid of a radical initiator, then an unsaturated group is indispensable. However, the silane may equally be chemically joined to the chain in another way (e.g. by causing the amino group of aminosilane to react with the alkyl group of ethylene-alkylacrylate, FIG. 3). The alkoxy groups of alkoxysilane are first hydrolyzed to become hydroxy groups as they react with polyvinylalcohol, and any hydrolyzable silane (e.g. chlorosilane) gains hydroxy groups at hydrolysis, which may condense with the hydroxy group of polyvinylalcohol.

EXAMPLE VIII

Using the same mixing techniques as in Tests 1–15, 60% PVA-1 blends were prepared. The silane was mixed and adsorbed in ground polyethylene (30%, 2 hrs., 23° C.) prior to use. The silane employed was vinyltrichlorosilane (VTC), γ-aminopropyltriethoxysilane (AMEO), vinyltrimethoxysilane (VTMO), and the polyolefin was, in addition to high pressure polyethylene (LDPE), ethylene-butylacrylate copolymer (EBA) (Table 7).

EXAMPLE IX

Testing of the various formulations prepared in Example VIII was carried out as in Example II, with the results being reported in Table 8.

Table 8 reveals that 60% PVA-1 can also be linked to polyolefin with the aid of vinyltrichlorosilane and any other hydrolyzable silane. It is noted on comparison of the results with the properties of the equivalent (60% PVA-1) polymer obtained with the aid of VTMO (Test 12), that VTC is not as efficient as VTMO when it is desired to achieve chemical linking of a polyolefin and PVA. The soluble part in Test 20 is somewhat larger, while the polymer in Test 20 has slightly higher oxygen transmission. However, degree of cross-linking and melt index are of the same order, independent of vinyl silane type. Chemical linking has definitely been achieved with the aid of VTC, this being best evident in a comparison with the equivalent formulation in which polyethylene and PVA are not chemically linked (Test 15).

In Table 8, the end result can be seen when 1 phr./AMEO and 60% PVA-1 have been allowed to react with 17% EBA (Test 21). This can be compared with the end result obtained when 17% EBA was grafted with 1 phr. VTMO and mixed together with 60% PVA-1 (Test 22). It is seen that when 17% EBA is used for the polyolefin (Test 22), the oxygen transmission is higher than if the polyolefin is LDPE (Test 12). The product is also softer and more ductile, and has greater elongation. When AMEO is used for the silane, the oxygen transmission is even higher and the product is even softer and more ductile. There are clearly fewer chemical linkages in this case, and for this reason the product has a higher melt index. However, the soluble part is very low, indicating that AMEO is fully usable to combine polyolefin and PVA with the aid of silane.

The above examples demonstrate that silanes other than unsaturated alkoxysilanes can also be used in chemically combining polyolefins and PVA.

The preceding description of the present invention is merely examplary, and is not intended to limit the scope thereof in any way.

TABLE 1

| | | phr. = parts per 100 parts of base polymer | | |
|---|---|---|---|---|
| Test | Polyolefin | Peroxide | Silane | PVA |
| 1 | LDPE, MI = 7.5; ρ = 0.918 | 0.05 phr. DCP | 0.5 phr. VTMO | 10% PVA-1 |
| 2 | LDPE, MI = 7.5; ρ = 0.918 | 0.05 phr. DCP | 1.0 phr. VTMO | 10% PVA-1 |
| 3 | LDPE, MI = 7.5; ρ = 0.918 | 0.05 phr. DCP | 1.5 phr. VTMO | 10% PVA-1 |
| 4 | LDPE, MI = 7.5; ρ = 0.918 | 0.05 phr. DCP | | 10% PVA-1 |
| 5 | LDPE, MI = 7.5; ρ = 0.918 | | | 10% PVA-1 |
| 6 | LDPE, MI = 7.5; ρ = 0.918 | 0.05 phr. DCP | 1.0 phr. VTEO | 10% PVA-1 |
| 7 | LDPE, MI = 7.5; ρ = 0.918 | 0.05 phr. DCP | 1.0 phr. VTMO | 10% PVA-2 |
| 8 | HDPE, MI = 5.0; ρ = 0.955 | 0.05 phr. DCP | 1.0 phr. VTMO | 10% PVA-1 |
| 9 | LDPE, MI = 7.5; ρ = 0.918 | 0.05 phr. DCP | 1.0 phr. VTMO | 20% PVA-1 |

TABLE 2

| Test | Melt Index g/10 min | Density g/cm³ | Degree of cross linking % | Yield Limit MPa | Ultimate Tensile Strength MPa | Elongation % | Soluble Part % | Oxygen Transmission (Oxtran 100, cm³/m²d) |
|---|---|---|---|---|---|---|---|---|
| 1 | 1.30 | 0.959 | 3.7 | 9.5 | 10.0 | 170 | 3.7 | 1,338 |
| 2 | 0.46 | 0.956 | 3.8 | 9.2 | 10.0 | 140 | 2.1 | 1,205 |
| 3 | 0.02 | 0.940 | 4.5 | 10.3 | 10.5 | 40 | 1.6 | 1,137 |
| 4 | 1.53 | 0.960 | 3.5 | 8.4 | 9.6 | 90 | 5.2 | 1,568 |
| 5 | 7.72 | 0.945 | 0.2 | 9.0 | 9.9 | 40 | 8.6 | 1,756 |
| 6 | 0.01 | 0.952 | 4.0 | 9.7 | 10.0 | 120 | 1.3 | 1,048 |
| 7 | 0.07 | 0.943 | 1.9 | 9.9 | 10.2 | 90 | 1.1 | 1,035 |
| 8 | 0.01 | 0.971 | 1.8 | 16.6 | 25.2 | 1010 | 2.7 | 423 |
| 9 | 0.01 | 0.970 | 3.2 | 10.3 | 11.4 | 80 | 2.4 | 663 |

TABLE 3

| | | phr. = parts per 100 parts of base polymer | | |
|---|---|---|---|---|
| Test | Polyolefin | Peroxide | Silane | PVA |
| 10 | LDPE, MI = 4,0; ρ = 0.922 | 0.03 phr DCP | 1.0 phr. VTMO | 40% PVA-1 |
| 11 | LDPE, MI = 4,0; ρ = 0.922 | 0.03 phr DCP | 1.0 phr. VTMO | 50% PVA-1 |
| 12 | LDPE, MI = 4,0; ρ = 0.922 | 0.03 phr DCP | 1.0 phr. VTMO | 60% PVA-1 |
| 13 | LDPE, MI = 0,2; ρ = 0.922 | | | 40% PVA-1 |
| 14 | LDPE, MI = 0,2; ρ = 0.922 | | | 50% PVA-1 |

TABLE 3-continued

| | phr. = parts per 100 parts of base polymer | | | |
|---|---|---|---|---|
| Test | Polyolefin | Peroxide | Silane | PVA |
| 15 | LDPE, MI = 0,2; ρ = 0.922 | | | 60% PVA-1 |

TABLE 4

| Test | Melt Index g/10 min | Density g/cm³ | Degree of cross linking % | Yield Limit MPa | Ultimate Tensile Strength MPa | Elongation % | Soluble Part % | Oxygen Transmission (Oxtran 100, cm³m²d) |
|---|---|---|---|---|---|---|---|---|
| 10 | 0.39 | 1.05 | 2.8 | 9.6 | 12.7 | 12 | 3.1 | 143 |
| 11 | 0.24 | 1.08 | 2.1 | 12.3 | 13.7 | 7 | 5.0 | 64 |
| 12 | 0.10 | 1.13 | 1.7 | 13.5 | 16.0 | 6 | 2.4 | 9 |
| 13 | 3.75 | 1.03 | 0.4 | 7.3 | 8.6 | 16 | 33.9 | 2,489 |
| 14 | 4.63 | 1.06 | 0.7 | 6.5 | 7.1 | 11 | 47.4 | 3,691 |
| 15 | 6.37 | 1.12 | 0.9 | 13.7 | 14.5 | 5 | 55.6 | 4,387 |

TABLE 5

| Test | Polyolefin | | PVA |
|---|---|---|---|
| 17 | MI = 0.2; ρ = 0.917 | 1% VTMO | 40% PVA |
| 18 | MI = 0.2; ρ = 0.917 | 1% VTMO | 50% PVA |
| 19 | Mi = 0.2; ρ = 0.917 | 1% VTMO | 60% PVA |

TABLE 6

| Test | Melt Index g/10 min | Density g/cm³ | Degree of Cross-linking % | Yield Limit MPa | Ultimate Tensile Strength MPa | Elongation % | Soluble Part % | Oxygen Transmission (Oxtran 100) (cm³/m²d) |
|---|---|---|---|---|---|---|---|---|
| 17 | <0.05 | 1.12 | 1.3 | 10.1 | 22.2 | 15 | 9.1 | 7 |
| 18 | <0.05 | 1.09 | 1.1 | 13.2 | 22.1 | 9 | 4.2 | 1 |
| 19 | <0.05 | 1.15 | 1.2 | 14.2 | 23.4 | 8 | 8.2 | <1 |

TABLE 7

| | phr. = parts per 100 parts of base polymer | | | |
|---|---|---|---|---|
| Test | Polyolefin | Peroxide | Silane | PVA |
| 20 | LDPE, MI = 4.0; ρ = 0.922 | 0.03 phr. DCP | 1.0 ph. VTC | 60% PVA-1 |
| 21 | EBA, MI = 4.0; 17% BA | — | 1.0 phr. AMEO | 60% PVA-1 |
| 22 | EBA, MI = 4.0; 17% BA | 0.03 phr. DCP | 1.0 phr. VTMO | 60% PVA1 |

TABLE 8

| Test | Melt Index g/10 min | Density g/cm³ | Degree of Cross-linking % | Yield Limit MPa | Ultimate Tensile Strength MPa | Elongation % | Soluble Part % | Oxygen Transmission (Oxtran 100) (cm³/m²d) |
|---|---|---|---|---|---|---|---|---|
| 20 | 0.15 | 1.12 | 2.3 | 12.7 | 14.3 | 5 | 5.6 | 13 |
| 21 | 2.32 | 1.15 | 0.7 | 10.7 | 15.6 | 27 | 2.5 | 22 |
| 22 | 0.21 | 1.10 | 1.0 | 11.3 | 13.2 | 16 | 2.1 | 18 |

What is claimed is:

1. Branched, block copolymer of a polyolefin chemically bound to polyvinyl alcohol by a hydrolyzable silane,
   said block copolymer comprising about 1-99% by weight of said polyolefin, and about 99-1% by weight of said polyolefin alcohol,
   the amount of said hydrolyzable silane bound to said polyolefin being sufficient to bind said polyvinyl alochol thereto.

2. The block copolymer of claim 1, wherein the amount of said hydrolyzable silane is between about 0.10-10% of the weight of said polyolefin.

3. The block copolymer of claim 2, wherein said silane is an unsaturated alkoxysilane.

4. The block copolymer of claim 3, wherein said silane is vinyltrimethoxysilane, vinyltriethoxysilane, vinyl-tris (betamethoxyethoxy)silane, or gammamethacryloxypropyltrimethoxysilane.

5. The block copolymer of claim 2, wherein said silane is an aminosilane.

6. The block copolymer of claim 2, wherein said silane is a chlorosilane.

7. The block copolymer claim 5, wherein said aminosilane is ρ-aminopropyltriethoxysilane.

8. The block copolymer of claim 6, wherein said chlorosilane is vinyltrichlorosilane.

9. The block copolymer of claim 2, having a melt index of less than about 0.2 g/10 min.

10. The block copolymer of claim 2, wherein said polyolefin is a copolymer.

11. The block copolymer of claim 2, wherein the polyvinyl alcohol comprises 0.5-100% by weight of vinyl alcohol.

* * * * *